No. 842,957. PATENTED FEB. 5, 1907.
C. DE KANDO.
ELECTRIC CAR AND LOCOMOTIVE.
APPLICATION FILED MAY 12, 1904.

WITNESSES
F. W. Wright
Walter Abbr

INVENTOR
Coloman de Kandó
BY
Howsar and Howsar
ATTORNEYS

UNITED STATES PATENT OFFICE.

COLOMAN DE KANDÓ, OF BUDAPEST, AUSTRIA-HUNGARY, ASSIGNOR TO WESTINGHOUSE MACHINE COMPANY, A CORPORATION OF PENNSYLVANIA.

ELECTRIC CAR AND LOCOMOTIVE.

No. 842,957.        Specification of Letters Patent.        Patented Feb. 5, 1907.

Application filed May 12, 1904. Serial No. 207,595.

*To all whom it may concern:*

Be it known that I, COLOMAN DE KANDÓ, a subject of the King of Hungary, residing at Budapest, in the Kingdom of Hungary, have invented certain new and useful Improvements in Electric Cars and Locomotives, of which the following is a specification.

My invention relates, among other things, to improvements in electric cars and locomotives, and more particularly to the manner of mounting the field structure or stationary part and of the bearing of the armature or rotating part driving the car-wheels by means of cranks and connecting-rods. When the motor is driving the wheels by means of cranks and connecting-rods, the bearings of the motor are subjected to strains which produce premature wearing of the brasses, so that it soon becomes necessary to adjust them. In the case of electric motors, the air-gap of which scarcely amounts to one or two millimeters, the adjustment of bearings is a very complicated matter, and it is very difficult to keep the fixed and the rotating parts in exactly concentric position.

My invention has, among other things, for its object to provide means whereby it is made possible to adjust the bearings which receive the crank-pressure without the relative position of the stationary and rotating parts of the motor being affected.

My invention consists of certain novel parts and combinations of parts particularly pointed out in the claims concluding this specification.

The invention will be more readily understood by reference to the accompanying drawings, forming a part of this specification, in which—

Figure 1:
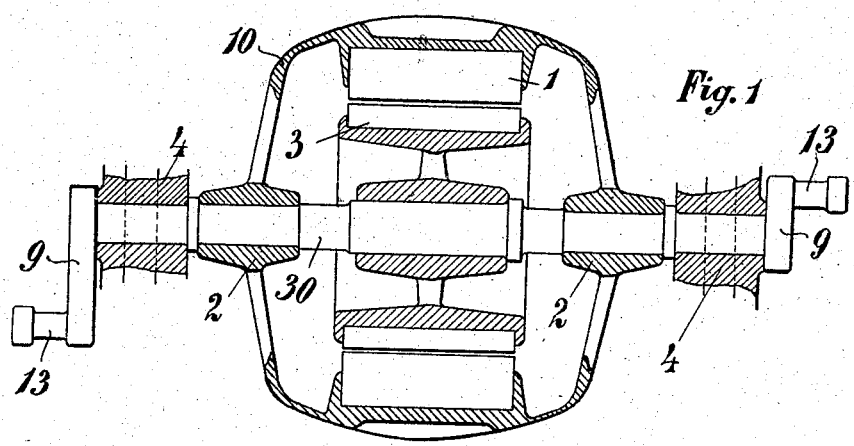
Figure 2:
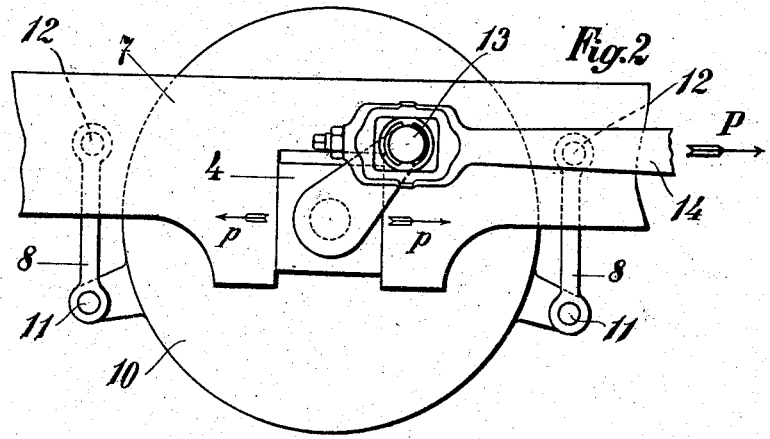
Figure 3:
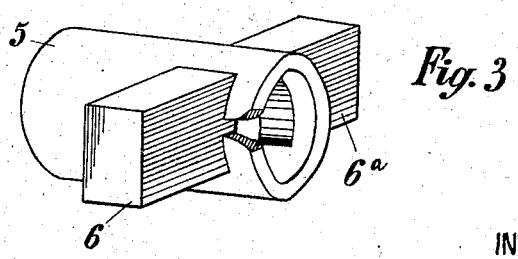

Figure 1 is a longitudinal section of the motor and its bearings; Fig. 2, a side elevation showing the yielding suspension of the stationary part, a part of the car-frame, and of the connecting-rod. Fig. 3 is a diagrammatical perspective view of combined motor-armature and crank-bearing, a part of the former being broken away.

Referring in detail to the drawings, 1 is the stationary part or stator of the motor. 10 is the casing of the same.

2 are the bearings secured to the motor-casing or formed integral with the same. Mounted within the casing is the rotating part or armature 3, the shaft 30 of which is journaled in the bearings 2, securing the exact concentric position of the armature with relation to the field structure. Owing to the yielding suspension of the casing in the manner described hereinafter, the bearings 2 cannot take up the crank-pressure and only have to support the weight of the shaft 30 and of the armature 3, so that owing to this small load these bearings wear very little and do not require adjustment.

The casing 10, containing the stationary part of the motor, is suspended by means of links 8, connected, respectively, by pivots 11 and 12 to the casing and to the framework or truck of the car. The links 8, which support the motor, prevent at the same time the stationary part from turning and allow free horizontal movement to the united stationary and rotating part of the motor.

7 designates a part of the main frame of the car, which is suitably supported upon a plurality of wheeled axles. (Not shown in the drawings.)

The shaft 30 is provided with cranks 9, the pins 13 of which are journaled in bearings of suitable connecting-rods 14. (Shown only partly in the drawings.) The connecting-rods 14 are driving two or more car-wheels by means of cranks. (Not shown in the drawings.)

The crank-pressure (indicated by arrows *p*) is taken up by a separate bearing 4, which is mounted in the vehicle-frame 7, so that the latter forms an abutment against which the forces produced by the crank act. These bearings can be made suitably adjustable without reference to the concentric relative positions of the stationary part and the armature, for when the bearing 4 is adjusted and the position of the shaft altered the latter moves the stationary part 1 by means of the bearings 2, so that the relative positions always remain the same. The bearings 2 4 can also be combined as shown in Fig. 3.

Another form of bearings involving my invention is shown in Fig. 3. 5 is a sleeve or bearing carried by the frame of the motor corresponding to the bearing 2 of Fig. 1. In this bearing the shaft 30 of the motor is journaled, as has already been described. This bearing is cut away on opposite sides in line with the direction of the strains produced by the crank-shaft. Through said cut-away portions blocks or brasses 6 6ª are inserted, the inner ends of these brasses being curved to conform to the interior contour of the sleeve or bearing 5. The shaft 30, journaled in said sleeve 5, is therefore in contact with and is held between the inner ends of these blocks 6 6ª, which inner ends form portions of the journal-bearing for said shaft. The outer ends of the blocks 6 6ª bear against abutments on the car-frame, to which abutments the strains produced by the crank-shaft are transmitted. The blocks 6 6ª therefore perform the functions of the bearing 4 of Fig. 2, these blocks being made adjustable to compensate for wear. It will therefore be seen that the bearing 5 for the shaft 30 is free to move in the direction of the strains produced by the crank-shaft, while the bearings 6 6ª for said shaft are rigid in the direction of the strains produced by the crank-shaft.

It should be noted that the invention can be applied as well on cars as on locomotives.

The present disclosure presents only one embodiment of my invention, and I therefore do not wish my invention to be unduly limited, since its features can be varied in diverse manner. I am to cover by the terms of the appended claims all modifications and variations which fall within the spirit and scope of my invention.

What I claim as new, and desire to secure by Letters Patent of the United States, is—

1. In an electric vehicle the combination of a frame, a motor, bearings centering the rotating part of said motor yielding in the direction of the driving strains, and bearings for the rotating part unyielding in the direction of the driving strains.

2. In an electric vehicle, the combination of a frame, a motor, a crank-shaft driven by said motor, bearings for supporting said motor said bearings being yielding in the direction of the strains produced by the crank-shaft and bearings rigid in the direction of strains produced by the crank-shaft.

3. In an electric vehicle, the combination of a frame, a motor, suspension-rods for supporting said motor pivotally connected to the frame and the motor, a crank-shaft driven by said motor and a bearing rigid in the direction of the strains produced by the crank-shaft.

4. In an electric vehicle the combination of a frame, a motor, the rotating element of which is journaled in bearings carried by the stationary element, means for supporting said motor, a crank-shaft driven by the rotating element and an independent bearing for receiving driving thrusts communicated through the crank-shaft.

5. In an electric vehicle the combination of a frame, a motor, the rotating element of which is journaled in bearings carried by the stationary element, flexible means for supporting said motor, a crank-shaft driven by the rotating element, and a bearing in the vehicle-frame for receiving driving thrusts communicated through the crank-shaft.

6. In an electric vehicle the combination of a frame, a motor, means for supporting said motor, a crank-shaft driven by the rotating element of said motor and an independent bearing for receiving driving thrusts communicated through the crank-shaft.

7. In an electric vehicle the combination of a motor having concentric stationary and rotating elements, bearings for maintaining the concentric relation of said elements, means for supporting said motor yieldingly in the direction of the driving pressures, and bearings transmitting such driving pressures to the vehicle independently of the stationary part of the motor.

8. In an electric vehicle the combination of a frame, a motor suspended to yield in the direction of the driving strains and bearings for the rotating part unyielding in the direction of the driving strains.

9. In an electric vehicle the combination of a frame, a motor suspended to yield in the direction of the driving strains and bearings for the rotating part unyielding in the direction of driving strains but yielding in another direction.

In testimony whereof I have signed my name to this specification in the presence of two subscribing witnesses.

COLOMAN DE KANDÓ.

Witnesses:
  LOUIS VANDORN,
  ANDREW KELEMEN.